(12) United States Patent
Hanafusa et al.

(10) Patent No.: US 11,766,672 B2
(45) Date of Patent: Sep. 26, 2023

(54) APPARATUS FOR MANIPULATING MAGNETIC PARTICLES

(71) Applicant: SHIMADZU CORPORATION, Kyoto (JP)

(72) Inventors: Nobuhiro Hanafusa, Kyoto (JP); Ayaka Minamimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 81 days.

(21) Appl. No.: 16/680,980

(22) Filed: Nov. 12, 2019

(65) Prior Publication Data

US 2020/0147604 A1     May 14, 2020

(30) Foreign Application Priority Data

Nov. 14, 2018    (JP) ................................. 2018-004416

(51) Int. Cl.
     *B01L 3/00*      (2006.01)
     *B03C 1/02*      (2006.01)
     *B01D 15/42*     (2006.01)

(52) U.S. Cl.
     CPC .............. *B01L 3/508* (2013.01); *B01D 15/42* (2013.01); *B03C 1/02* (2013.01);
     (Continued)

(58) Field of Classification Search
     CPC ............. B01L 3/508; B01L 2300/0832; B01L 2200/0647; B01L 2300/06; B01L 1/02; B01L 2200/02; B01L 2400/043; B01L 2200/145; B03C 1/02; B03C 1/288; B03C 1/30; B03C 1/0332; B03C 1/01; B03C 2201/26; B03C 2201/18; B01D 15/42; B01D 2215/021
     (Continued)

(56) References Cited

U.S. PATENT DOCUMENTS 5,536,475 A * 7/1996 Moubayed ....... G01N 33/56966
                                                         209/225
6,509,193 B1    1/2003   Tajima
(Continued)

FOREIGN PATENT DOCUMENTS

WO          97/44671 A1     11/1997
WO      2012/086243 A1    6/2012
WO    WO-2018185908 A1 * 10/2018 .............. B01J 19/08

*Primary Examiner* — Matthew D Krcha
*Assistant Examiner* — Jacqueline Brazin
(74) *Attorney, Agent, or Firm* — Sughrue Mion, PLLC

(57) ABSTRACT

An apparatus for manipulating magnetic particles includes a latch mechanism. The latch mechanism has a pivoting part provided on a door and an engaging part provided on a main body. In the apparatus for manipulating magnetic particles, a first contact portion of a latch engages with the engaging part at a contact point in a state that the door is closed. The contact point is located more outside of the main body than the pivot axis. Accordingly, in a case where an external force is applied to the door in a direction to open the door in a state that the door is closed, a force is applied from the engaging part to the first contact portion, thereby generating a rotational force in a C direction to the pivoting part. As a result, in the state that the door is closed, it is possible to suppress the door from being opened without a manipulation by the user.

4 Claims, 9 Drawing Sheets

(52) U.S. Cl.
CPC . *B01D 2215/021* (2013.01); *B01L 2200/0647* (2013.01); *B01L 2300/06* (2013.01); *B01L 2300/0832* (2013.01)

(58) Field of Classification Search
USPC .......................................... 422/534
See application file for complete search history.

(56) References Cited

U.S. PATENT DOCUMENTS

2001/0019826 A1* 9/2001 Ammann .............. B01F 9/0001
                                                                                                                        435/6.11
2013/0273552 A1 10/2013 Ohashi

* cited by examiner

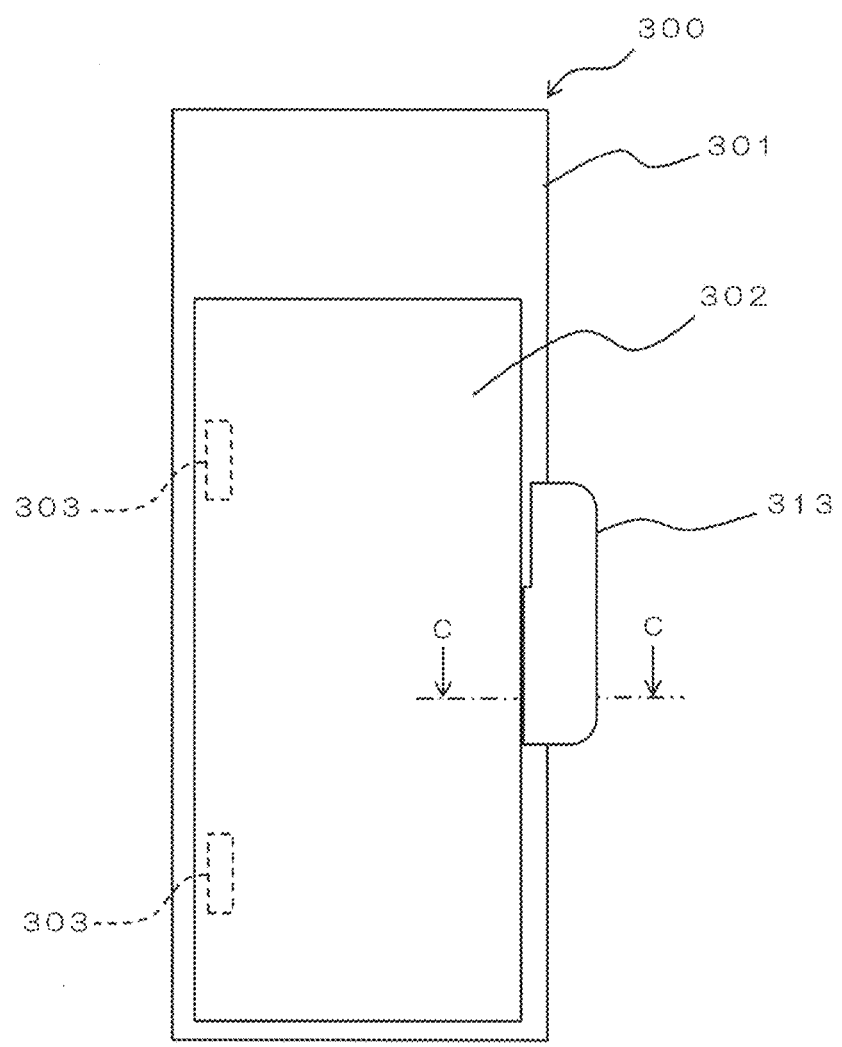

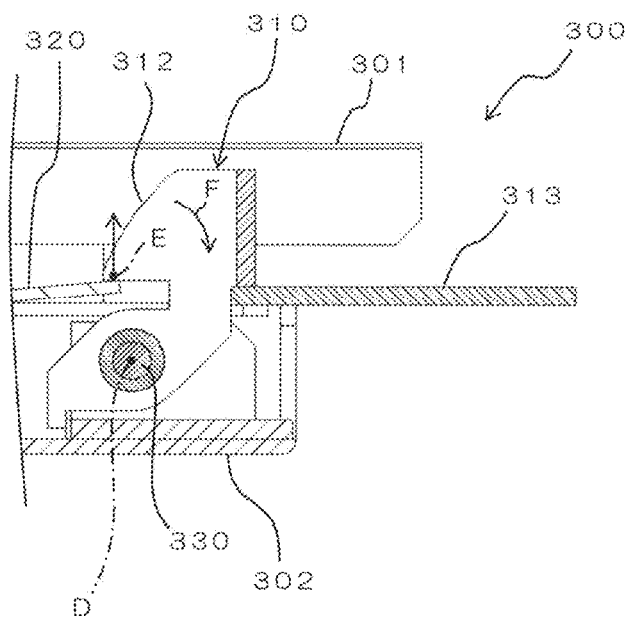

APPARATUS FOR MANIPULATING MAGNETIC PARTICLES

CROSS REFERENCE TO RELATED APPLICATIONS

This application claims priority to Japanese utility model Application No. 2018-004416 filed on Nov. 14, 2018, the entire disclosure of which is incorporated by reference herein.

BACKGROUND OF THE INVENTION

Field of the Invention

The present invention relates to an apparatus for manipulating magnetic particles that moves magnetic particles in a tubular container in which a liquid layer is formed.

Description of the Related Art

In medical examinations, food safety and sanitation management, monitoring for environmental protection, and the like, it is required to extract a target substance from a sample containing a wide variety of contaminants and to provide the extracted substance for detection and reaction. For example, in medical examinations, it is necessary to detect, identify and quantify nucleic acids, proteins, sugars, lipids, bacteria, viruses, radioactive substances, and the like contained in blood, serum, cells, urine, feces, and the like separated and obtained from animals and plants. In these examinations, it may be necessary to separate and purify the target substance in order to eliminate adverse effects such as backgrounds caused by contaminants.

In order to separate and purify the target substance in the sample, a method has been developed and brought into practical use that uses magnetic particles of magnetic material with particle diameters of about 0.5 μm to about several tens of μm whose surfaces are given chemical affinity with the target substance and a molecular recognition function. In this method, after the target substance is immobilized to the surfaces of the magnetic particles, steps of separating and recovering the magnetic particles from a liquid phase by manipulating a magnetic field, dispersing the recovered magnetic particles in a liquid phase such as washing liquid if necessary, and separating and recovering the magnetic particles from the liquid phase, are repeated. Thereafter, by dispersing the magnetic particles in an eluate, the target substance immobilized to the magnetic particles are separated in the eluate, and the target substance in the eluate is recovered. Use of the magnetic particles enables recovery of the target substances with a magnet, which has an advantageous characteristic for automation of chemical extraction and purification.

Magnetic particles capable of selectively immobilizing a target substance are commercially available as part of a separation and purification kit. The kit contains several reagents in separate containers, and when it is used, the user collects and dispenses the reagents with a pipette or the like. An apparatus for automating these pipetting manipulations and magnetic field manipulations is also commercially available (WO97/44671). On the other hand, instead of pipetting, a method has been proposed that uses a tubular device in which a liquid layer such as a solution/fixing solution, a washing liquid, and an eluate and a gelatinous medium layer are alternately stacked in a tubular container such as a capillary, and separates and purifies a target substance by moving magnetic particles along a longitudinal direction of the container in this device (WO2012/086243).

In the above configuration in which magnetic particles are moved in a tubular container as described above, a magnet as a magnetic field application part provided on an outside of the container is moved along the longitudinal direction of the container to cause a change in the magnetic field. Following the change in the magnetic field, the magnetic particles also move along the longitudinal direction of the container, and the magnetic particles sequentially move through the alternately stacked liquid layer and gelatinous medium layer. When moving magnetic particles in this manner, the container is installed in the apparatus for manipulating magnetic particles.

FIG. 8 is a front view illustrating a conventional apparatus 300 for manipulating magnetic particles (apparatus 300). FIG. 9 is a cross-sectional view taken along a line C-C in FIG. 8.

The apparatus 300 includes a main body 301 and a door 302.

The door 302 is formed in a flat plate shape having a rectangular shape in front view, and is pivotally attached to the main body 301. Specifically, one end (a left end in FIG. 8) of the door 302 in front view is attached to the main body 301 by a fixing device 303. Thus, the door 302 is configured to be pivotable about the one end (the left end in FIG. 8). Although not illustrated, the tubular container is installed on the main body 301 (a front surface of the main body 301) in a state of extending in an up and down direction, and by closing the door 302, the container is fixed (held) in a state of being pressed against the main body 301 side by an inner face of the door 302. Further, a back side of the main body 301 is open, and the magnetic particles can be moved inside the container by moving a magnet in the up and down direction along the container through this opening.

SUMMARY OF THE INVENTION

As described above, when holding the container in the apparatus 300, in order to stabilize the container, the door 302 needs to be fixed to the main body 301 in a closed state. In the apparatus 300, a latch mechanism is provided to fix the door 302 to the main body 301 in a closed state. Specifically, as illustrated in FIG. 9, the apparatus 300 includes a pivoting part 310 and an engaging part 320.

The pivoting part 310 includes a latch 312 and a gripping part 313. The door 302 is provided with a cylindrical shaft part 330 extending in the up and down direction. The latch 312 is pivotably attached to the shaft part 330. Thus, the latch 312 can pivot about a pivot axis D extending in the up and down direction. The latch 312 is partially formed in a hook shape. The gripping part 313 is formed in a plate shape, and continuously extends outward of the door 302 from the latch 312.

The engaging part 320 is formed in a plate shape and is fixed to the main body 301.

In a state that the door 302 is closed, as illustrated in FIG. 9, the latch 312 of the pivoting part 310 is engaged with the engaging part 320. Thus, the door 302 is fixed to the main body 301 in a closed state.

However, in the apparatus 300 illustrated in FIG. 9, the door 302 may open without a manipulation by the user. Specifically, in the apparatus 300, a contact point E between the latch 312 and the engaging part 320 is located more inside (on a left side in FIG. 9) of the main body 301 than the pivot axis D. Therefore, when a force is applied to the door 302 in a direction to open the door 302, the latch 312 receives a force from the engaging part 320 due to the engagement between the latch 312 and the engaging part 320. Then, a rotational force directed in a clockwise direction (F direction) in plan view is generated with respect to the latch 312 by the force. As a result, the engaging state between the latch 312 and the engaging part 320 is released without the user manipulating the gripping part 313, and the door 302 opens. In this case, the fixed state of the container in the apparatus 300 is released, and the container becomes unstable.

This invention has been made in view of the above situation, and it is an object thereof to provide an apparatus for manipulating magnetic particles which can maintain a door in a closed state in a stable state.

(1) An apparatus for manipulating magnetic particles according to the present invention includes a main body, a magnetic field application part, a door, and a latch mechanism. The main body holds a tubular container in which a liquid layer is formed and which is filled with magnetic particles. The magnetic field application part is provided in the main body, and moves relative to the container held by the main body to change the magnetic field, so as to move the magnetic particles in the container. The door is pivotally attached to the main body, and pivotally moves between a closed position opposing the container and an open position separated from the container. The latch mechanism keeps the door in a state of being located in the closed position. The latch mechanism has a pivoting part and an engaging part. The pivoting part is pivotable about a pivot axis. The engaging part engages with the pivoting part by contacting the pivoting part at a contact position in a state that the door is located in the closed position, in which an engaging state is released when the pivoting part is pivoted in a predetermined direction about the pivot axis. In the apparatus for manipulating magnetic particles, in a case where an external force is applied in a direction toward the open position to the door located in the closed position, a force operates on the pivoting part at the contact position from the engaging part in a direction to pivot the pivoting part toward a side opposite to the predetermined direction.

With such a configuration, in a case where an external force is applied in a direction toward the open position to the door in a state that the door is located in the closed position, a force is applied from the engaging part to the pivoting part in a direction opposite to a direction in which the engaging state with the engaging part is released.

Accordingly, in the state that the door is closed (state of being located in the closed position), it is possible to suppress the door from opening without a manipulation by the user.

As a result, in the apparatus for manipulating magnetic particles, the door in a closed state can be maintained in a stable state.

(2) Moreover, in a state that the door is located in the closed position, the pivot axis may be located closer to a pivot center side of the door than the contact position in a radial direction orthogonal to both an opposing direction of the door and the main body and a vertical direction in which the pivot axis extends.

With such a configuration, in a state that the door is located in the closed position, a force can be reliably applied from the engaging part to the pivoting part in the direction opposite to the direction in which the engaging state with the engaging part is released.

(3) Moreover, the pivoting part may be provided on the door. The engaging part may be provided on the main body.

With such a configuration, the door in a closed state can be maintained in a stable state with a simple configuration.

(4) Further, the pivoting part may be provided on the main body. The engaging part may be provided on the door.

With such a configuration, the door in a closed state can be maintained in a stable state with a simple configuration.

(5) Further, the latch mechanism may have a biasing member. The biasing member biases the pivoting part in a direction to pivot toward a side opposite to the predetermined direction.

With such a configuration, it is possible to apply a biasing force to the pivoting part in the direction opposite to the direction in which the engaging state with the engaging part is released.

Accordingly, in the state that the door is closed, it is possible to further suppress the door from being opened without the manipulation of the user. Then, the door in a closed state can be maintained in a stable state.

Further, the apparatus for manipulating magnetic particles may further include a pressing member. The pressing member is provided on the door, contacts the container held by the main body when the door is closed, and exerts an elastic force in a direction in which the container approaches the magnetic field application part.

With such a configuration, in a state that the door is closed, the container can be positioned by the elastic force from the pressing member operating on the container.

Therefore, in a state that the door is closed, the distance between the container and the magnetic field application part can be accurately maintained.

According to the present invention, in a case where an external force is applied in a direction toward an open position to the door in a state that the door is located in a closed position, a force is applied from an engaging part to a pivoting part in a direction opposite to a direction in which an engaging state with the engaging part is released. Therefore, in the state that the door is closed, it is possible to suppress the door from being opened without the manipulation by the user. As a result, in the apparatus for manipulating magnetic particles, the door in a closed state can be maintained in a stable state.

BRIEF DESCRIPTION OF THE DRAWINGS

FIG. 8 is a front view illustrating a conventional apparatus for manipulating magnetic particles; and FIG. 9 is a cross-sectional view taken along a line C-C in FIG. 8.

DETAILED DESCRIPTION OF THE PREFERRED EMBODIMENTS

1. Device for Manipulating Magnetic Particles

Figure 1:
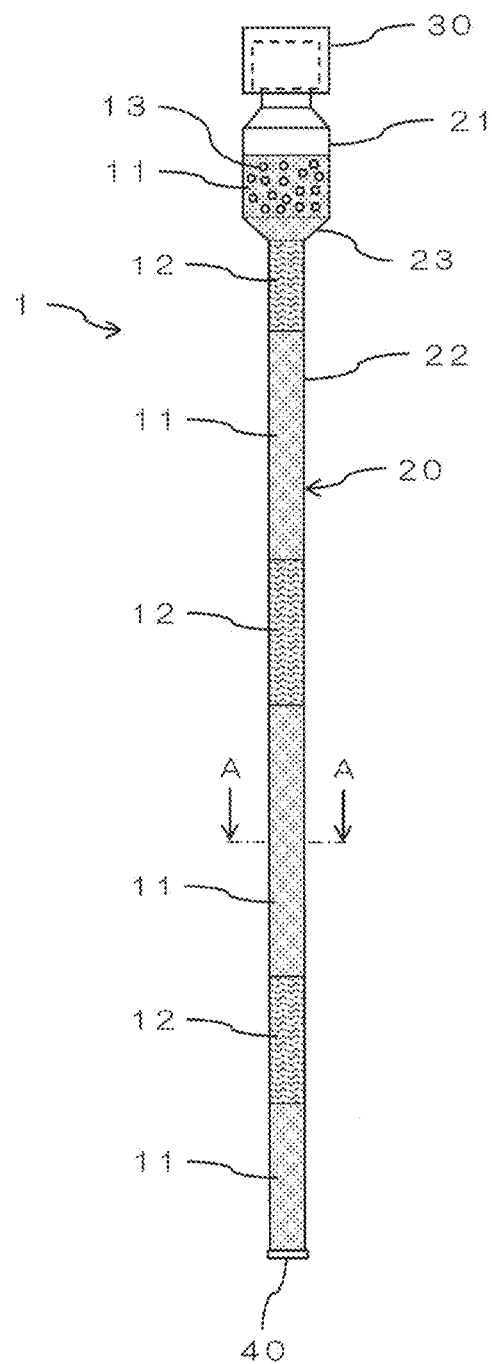
FIG. 1 is a front view illustrating a configuration example of a device for manipulating magnetic particles used in an apparatus for manipulating magnetic particles according to one embodiment of the present invention.
Figure 2:
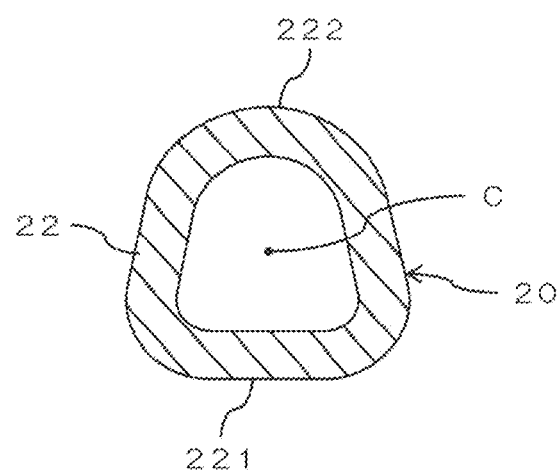
FIG. 2 is a cross-sectional view taken along a line A-A in FIG. 1.

FIG. 1 is a front view illustrating a configuration example of a device 1 for manipulating magnetic particles used in an apparatus 100 for manipulating magnetic particles according to one embodiment of the present invention. FIG. 2 is a cross-sectional view taken along a line A-A of FIG. 1. The device 1 for manipulating magnetic particles (hereinafter referred to as "device 1") is for extracting and purifying a target substance from a liquid sample. The device 1 for manipulating magnetic particles includes a linearly extending tubular container 20 and a cap 30 mounted on an upper part of the container 20.

In the container 20, a plurality of liquid layers 11 and a plurality of gelatinous medium layers 12 are formed. Specifically, a liquid layer 11 is formed at a lowermost portion of the container 20, and gelatinous medium layers 12 and liquid layers 11 are alternately stacked upward in a longitudinal direction. In this example, four liquid layers 11 and three gelatinous medium layers 12 are alternately formed in the longitudinal direction, but the present invention is not limited thereto. The numbers of liquid layers 11 and gelatinous medium layers 12 can be set arbitrarily.

The liquid layer 11 at an uppermost part of the container 20 is a liquid sample containing a target substance, and is loaded with a large number of magnetic particles 13. The liquid layer 11 at the lowermost portion of the container 20 is an eluate for eluting the target substance in the liquid sample. One or more (two in this example) liquid layers 11 in a middle part of the container 20 are washing liquids for removing contaminants contained in the liquid sample. These respective liquid layers 11 are separated from one another by a gelatinous medium layer 12. The target substance contained in the liquid sample is immobilized to the magnetic particles 13 and then subjected to a manipulation to be moved from the uppermost portion to the lowermost portion of the container 20 by changing the magnetic field (particle manipulation), during which the substance is extracted into the lowermost extraction liquid after being washed by a washing liquid.

The magnetic particles 13 are particles capable of specifically immobilizing a target substance such as a nucleic acid or an antigen to a surface or in an inside thereof. By dispersing the magnetic particles 13 in the liquid layer 11 at the uppermost portion of the container 20, the target substance contained in the liquid layer 11 is selectively immobilized to the magnetic particles 13.

The method of immobilizing the target substance to the magnetic particles 13 is not particularly limited, and various known fixing mechanisms such as physical adsorption and chemical adsorption can be applied. For example, the target substance is immobilized to surfaces or in insides of the magnetic particles 13 by various intermolecular forces such as van der Waals force, hydrogen bond, hydrophobic interaction, interionic interaction, π-π stacking, and the like.

Particle diameters of the magnetic particles 13 are preferably 1 mm or less, more preferably 0.1 µm to 500 µm, and still more preferably 3 to 5 µm. Shapes of the magnetic particles 13 are desirably spherical shapes having uniform particle diameters, but may be irregular shapes and have a particle diameter distribution to some extent as long as particle manipulation is possible. The constituent component of the magnetic particles 13 may be a single substance or may be composed of a plurality of components.

The magnetic particles 13 may be constituted of only a magnetic material, but ones having a coating for specifically immobilizing the target substance to the surface of the magnetic material are preferably used. Examples of the magnetic material include iron, cobalt, nickel, and compounds, oxides, alloys, and the like thereof. Specific examples include magnetite ($Fe_3O_4$), hematite ($Fe_2O_3$ or $\alpha Fe_2O_3$), maghemite ($\gamma Fe_2O_3$), titanomagnetite ($xFe_2TiO_4 \cdot (1-x)Fe_3O_4$), ilmenohematite ($xFeTiO_3 \cdot (1-x)Fe_2O_3$), pyrrhotite ($Fe_{1-x}S$ (x=0 to 0.13) . . . $Fe_7S_8$ (x to 0.13)), greigite ($Fe_3S_4$), goethite ($\alpha FeOOH$), chromium oxide ($CrO_2$), permalloy, alconi magnet, stainless steel, samarium magnet, neodymium magnet, a barium magnet.

Examples of the target substance to be selectively immobilized to the magnetic particles 13 include biological origin substances such as nucleic acids, proteins, sugars, lipids, antibodies, receptors, antigens, ligands, and the like, and cells themselves. When the target substance is a biological origin substance, the target substance may be immobilized to insides or particle surfaces of the magnetic particles 13 by molecular recognition or the like. For example, when the target substance is a nucleic acid, magnetic particles having a silica coating on the surface are preferably used as the magnetic particles 13. When the target substance is an antibody (for example, a labeled antibody), a receptor, an antigen, a ligand, and the like, the target substance can be selectively immobilized to the particle surfaces by an amino group, a carboxyl group, an epoxy group, apidine, piotin, digoxigenin, protein A, protein G, and the like to the surfaces of the magnetic particles 13.

When the target substance is a nucleic acid, it is sufficient if the washing liquid is capable of separating a component other than the nucleic acid contained in the liquid sample (for example, protein, carbohydrate, and the like), a reagent used for a treatment such as extraction of nucleic acid, and the like into the washing liquid while maintaining a state that the nucleic acid is immobilized to the surfaces of the magnetic particles 13. Examples of the washing liquid include aqueous solutions with high salt concentration such as sodium chloride, potassium chloride, and ammonium sulfate, and aqueous alcohols such as ethanol and isopropanol.

As an eluate for eluting nucleic acid (nucleic acid eluate), a buffer solution containing water or low concentrations of salt can be used. Specifically, tris buffer solution, phosphate buffer solution, distilled water, or the like can be used, and 5 to 20 mM tris buffer solution adjusted to pH 7 to 9 is typically used. By dispersing the magnetic particles 13 to which the nucleic acid is immobilized in the eluate, the nucleic acid can be separated and eluted in the nucleic acid eluate. The recovered nucleic acid can be subjected to manipulations such as concentration and drying as necessary, and can be used thereafter for analysis, reaction, and the like.

The gelatinous medium layer 12 is in a gel form or a paste form before particle manipulation. The gelatinous medium layer 12 is preferably insoluble or slightly soluble in the adjacent liquid layer 11 and is made of a chemically inert substance. Here, to be insoluble or slightly soluble in liquid means that solubility in liquid at 25° C. is about 100 ppm or less. The chemically inert substance refers to a substance that does not chemically affect the liquid layer 11, the magnetic particles 13, and the substance immobilized to the magnetic particles 13 through contact with the liquid layer 11 or manipulation of the magnetic particles 13 (that is, manipulation of moving the magnetic particles 13 in the gelatinous medium layer 12).

The material, composition, and the like of the gelatinous medium layer 12 are not particularly limited, and may be physical gels or chemical gels. For example, as described in WO2012/086243, a physical gel is formed by heating a water-insoluble or slightly water-soluble liquid substance, adding a gelling agent to the heated liquid substance, completely dissolving the gelling agent, and thereafter cooling the substance to a temperature below the sol-gel transition temperature.

Loading of the liquid layer 11 and the gelatinous medium layer 12 into the container 20 may be performed by any appropriate method. When the tubular container 20 is used as in the present embodiment, preferably, an opening on one end (for example, a lower end) of the container 20 is sealed prior to loading, and the liquid layer 11 and the gelatinous medium layer 12 are sequentially loaded through an opening on the other end (for example, an upper end).

The volumes of the liquid layer 11 and the gelatinous medium layer 12 loaded in the container 20 can be appropriately set according to the amount of the magnetic particles 13 to be manipulated, the type of manipulation, and the like. When pluralities of liquid layers 11 and gelatinous medium layers 12 are provided in the container 20 as in the present embodiment, the volume of each layer may be the same or different. A thickness of each layer can also be set appropriately. In a case where operability and the like are considered, the thickness of each layer is preferably, for example, about 2 mm to 20 mm.

An uppermost portion of the container 20 is a bulging portion 21 having a larger inner diameter and outer diameter than the other portions. An upper surface of the bulging portion 21 is an opening, and the opening can be sealed with a cap 30 that is removable from the bulging portion 21. With the cap 30 removed, the liquid sample is injected into the bulging portion 21 to form the liquid layer 11 at the uppermost portion of the container 20.

A portion below the bulging portion 21 in the container 20 is a straight portion 22 whose cross-sectional shape orthogonal to the longitudinal direction is a constant shape as illustrated in FIG. 2. The bulging portion 21 and the straight portion 22 are connected by the tapered portion 23 which tapers toward the straight portion 22 side from the bulging portion 21 side. An opening is formed at a lower end of the straight portion 22 (a bottom surface of the container 20), and the opening is sealed with a film member 40. The target substance extracted in the eluate which is the liquid layer 11 at the lowermost portion of the container 20 can be sucked into a pipette by inserting the pipette into the eluate so as to penetrate the film member 40. The film member 40 is made of, for example, aluminum or the like, but is not limited thereto.

The material of the container 20 is not particularly limited as long as it allows moving the magnetic particles 13 in the container 20 and can hold the liquid layer 11 and the gelatinous medium layer 12. In order to move the magnetic particles 13 in the container 20 by performing a manipulation (a magnetic field manipulation) to change the magnetic field from outside the container 20, a magnetically permeable material such as plastic is preferable, and examples thereof include a polyolefin such as polypropylene and polyethylene, fluorine-based resins such as tetrafluoroethylene, and resin materials such as polyvinyl chloride, polystyrene, polycarbonate, and cyclic polyolefin. As a material of the container 20, ceramic, glass, silicone, nonmagnetic metal, or the like may be used besides the above-mentioned raw material. In order to increase water repellency of an inner wall surface of the container 20, coating with a fluorine resin, silicone, or the like may be performed.

As for the shape of the container 20, as illustrated in FIG. 2, a cross-sectional shape (a cross-sectional shape orthogonal to the longitudinal direction) of the straight portion 22 below the bulging portion 21 in the container 20 is asymmetrical with respect to a center C. Specifically, an outer peripheral surface on a front side of the straight portion 22 is a flat surface 221, and an outer peripheral surface on a back side that is opposite across the center C is a protruding curved surface 222. However, the shape of the container 20 is not limited to the shape as described above, and the cross-sectional shape of the straight portion 22 may be symmetrical (for example, circular) with respect to the center C, for example. In addition, the flat surface 221 may be circular instead of flat.

2. Apparatus for Manipulating Magnetic Particles

Figure 3:
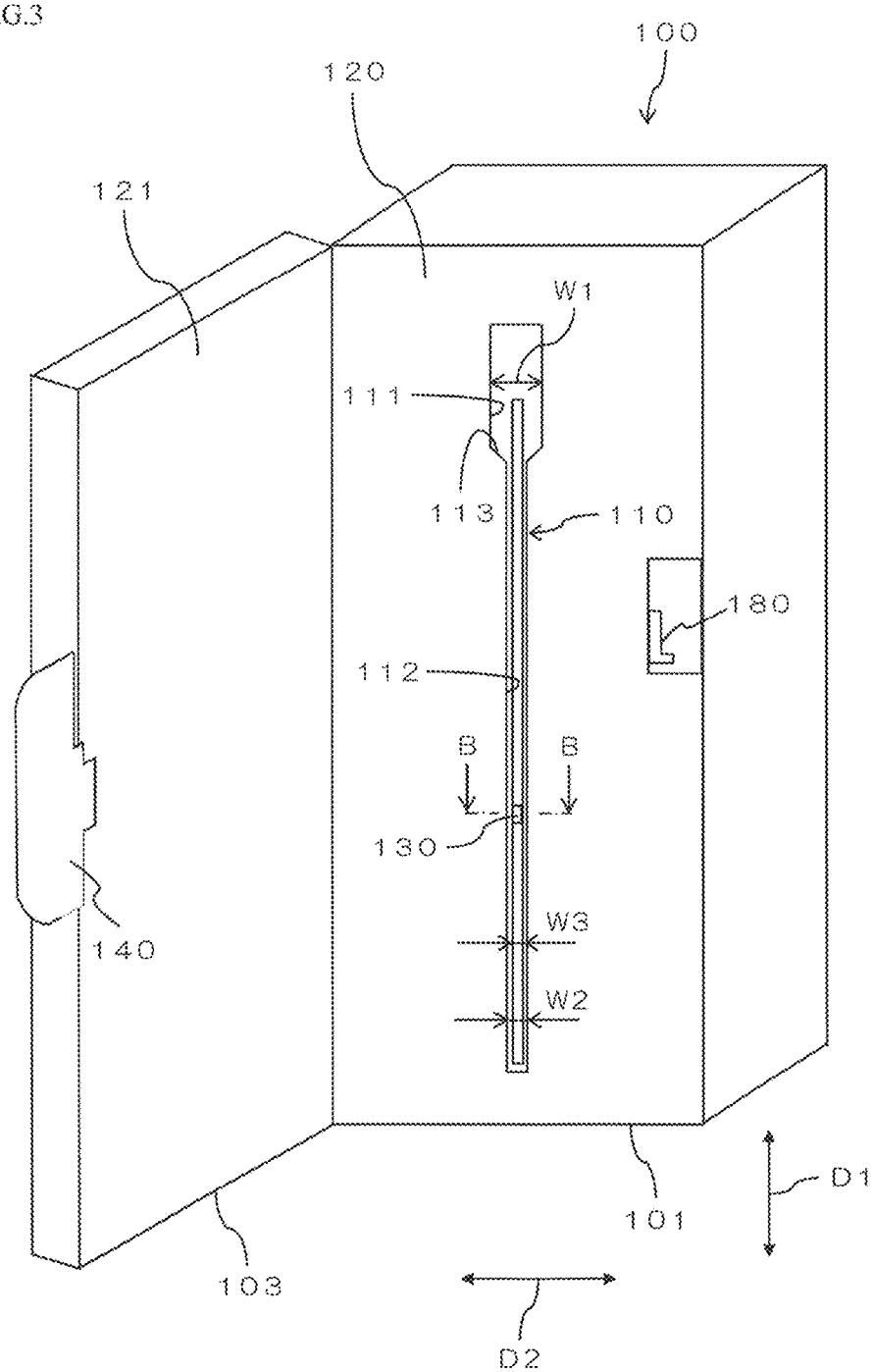
FIG. 3 is a front view illustrating a configuration example of the apparatus for manipulating magnetic particles according to one embodiment of the present invention.
Figure 4:
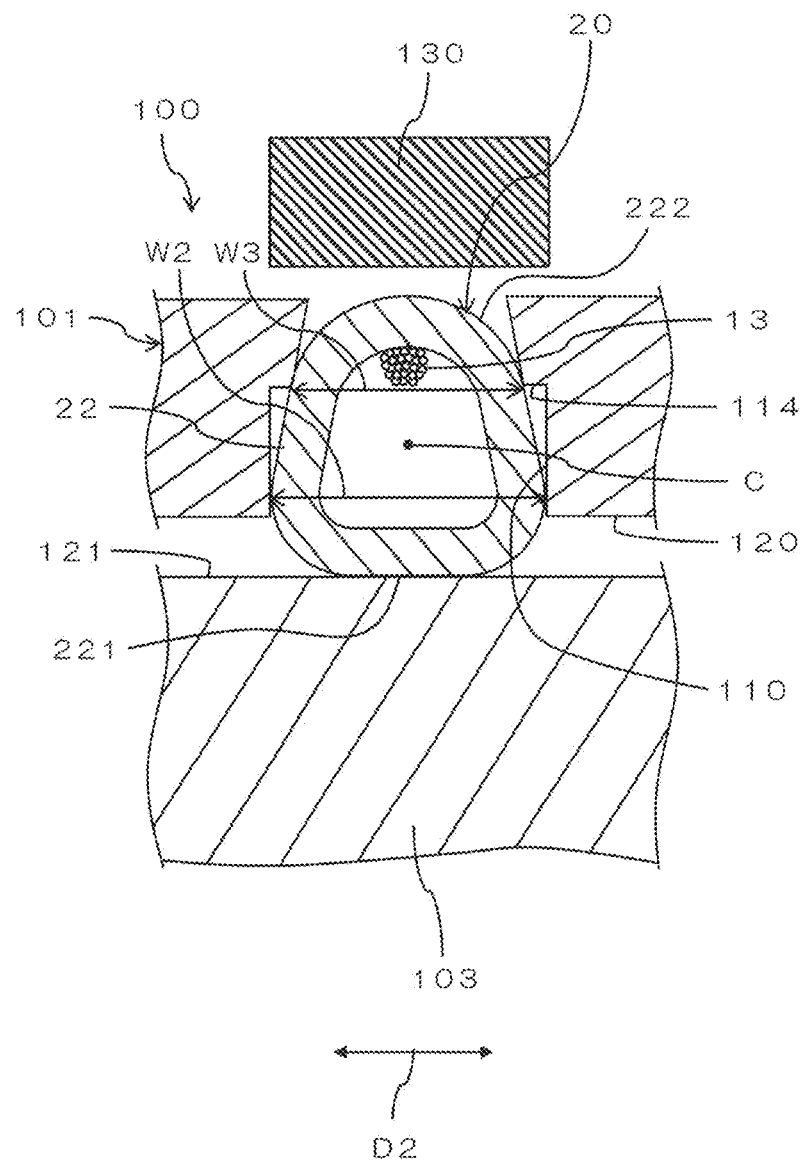
FIG. 4 is a cross-sectional view taken along a line B-B in FIG. 3.

FIG. 3 is a front view illustrating a configuration example of an apparatus 100 for manipulating magnetic particles according to an embodiment of the present invention. FIG. 4 is a cross-sectional view taken along a line B-B in FIG. 3. The apparatus 100 for manipulating magnetic particles (hereinafter referred to as "apparatus 100") is used in a state that the device 1 illustrated in FIGS. 1 and 2 is fixed, and is for performing particle manipulation on a target substance contained in a liquid sample in the container 20 of the device 1.

The apparatus 100 includes a main body 101 in which a container holding part 110 that holds the device 1 is formed, and a door 103 attached to the main body 101.

The door 103 is formed in a flat plate shape having a rectangular shape in front view, and is pivotably attached to the main body 101. Specifically, one end (a left end in the closed state) of the door 103 in front view is attached to the main body 101 by a fixing device (not illustrated). Thus, the door 103 is configured to be pivotable about the one end.

The container holding part 110 is constituted of a concave portion formed in a front surface 120 of the main body 101. The container holding part 110 is formed such that a first housing portion 111 that houses the bulging portion 21 of the container 20 of the device 1 and a second housing portion 112 that houses the straight portion 22 extend continuously in an up and down direction D1. In addition, in the container holding part 110, a width in a lateral direction D2 which is orthogonal to a direction in which the straight portion 22 extends (up and down direction D1) and in parallel to the front surface 120 of the main body 101 is a width corresponding to the device 1.

Specifically, a width W1 of the first housing portion 111 in the lateral direction D2 is slightly larger than a width of the bulging portion 21 of the container 20. On the other hand, a width W2 of the second housing portion 112 in the lateral direction D2 is slightly larger than a width of the straight portion 22 of the container 20 and smaller than the width of the bulging portion 21. Further, the first housing portion 111 and the second housing portion 112 are connected by a narrowed portion 113 which is inclined at an angle corresponding to the tapered portion 23 of the container 20. Thus, in a state that the container 20 is housed in the container holding part 110, the tapered portion 23 of the container 20 is caught by the narrowed portion 113 of the container holding part 110 and held in a suspended state.

As illustrated in FIG. 4, the container 20 is housed in the container holding part 110 such that the flat surface 221 extends in the lateral direction D2 and the protruding curved surface 222 is positioned closer to the back side than the flat surface 221. On the inner surface of the second housing portion 112 of the container holding part 110, a step portion 114 which protrudes inward from both sides in the lateral direction D2 is formed. A width W3 in the lateral direction D2 of the first housing portion 111 at the step portion 114 is smaller than the width W2 on the front surface 120 side and smaller than the width in the lateral direction D2 of the straight portion 22 of the container 20.

Therefore, the straight portion 22 of the container 20 housed in the container holding part 110 from the front surface 120 side is in a state that the protruding curved surface 222 side is in contact with the step portion 114. At this time, the flat surface 221 of the container 20 is in a state of projecting from the container holding part 110 more forward than the front surface 120 of the main body 101. In this state, by closing the door 103, as illustrated in FIG. 4, an abutting surface 121 of the door 103 can be brought to abut against the flat surface 221 of the container 20 and can press the container 20 toward the back side. Thus, the straight portion 22 of the container 20 can be sandwiched between the abutting surface 121 and the step portion 114, and the straight portion 22 can be firmly fixed in a state that warping of the straight portion 22 is eliminated.

The back side of the container holding part 110 is open, and a permanent magnet 130 is disposed to oppose the container holding part 110. The permanent magnet 130 is slidably held in the main body 101 along the up and down direction D1. The permanent magnet 130 attracts the magnetic particles 13 in the container 20 by magnetic force. Thus, as illustrated in FIG. 4, the magnetic particles 13 are gathered on the protruding curved surface 222 side. The magnetic particles 13 in the container 20 can be moved in the up and down direction D1 by moving the permanent magnet 130 in the up and down direction D1 while the magnetic particles 13 are attracted to the permanent magnet 130 in this manner.

As described above, the permanent magnet 130 constitutes a magnetic field application part that moves the magnetic particles 13 in the container 20 by changing the magnetic field. The permanent magnet 130 may be slid by a drive unit such as a motor or may be slid manually. The shape, size, and material of the permanent magnet 130 are not particularly limited as long as the magnetic particles 13 can be manipulated. As a source of magnetic force of the magnetic field application part, an electromagnet may be used other than the permanent magnet 130. Also, the magnetic field application part may have a plurality of sources of magnetic force.

3. Manipulation of Magnetic Particles

Figure 5:
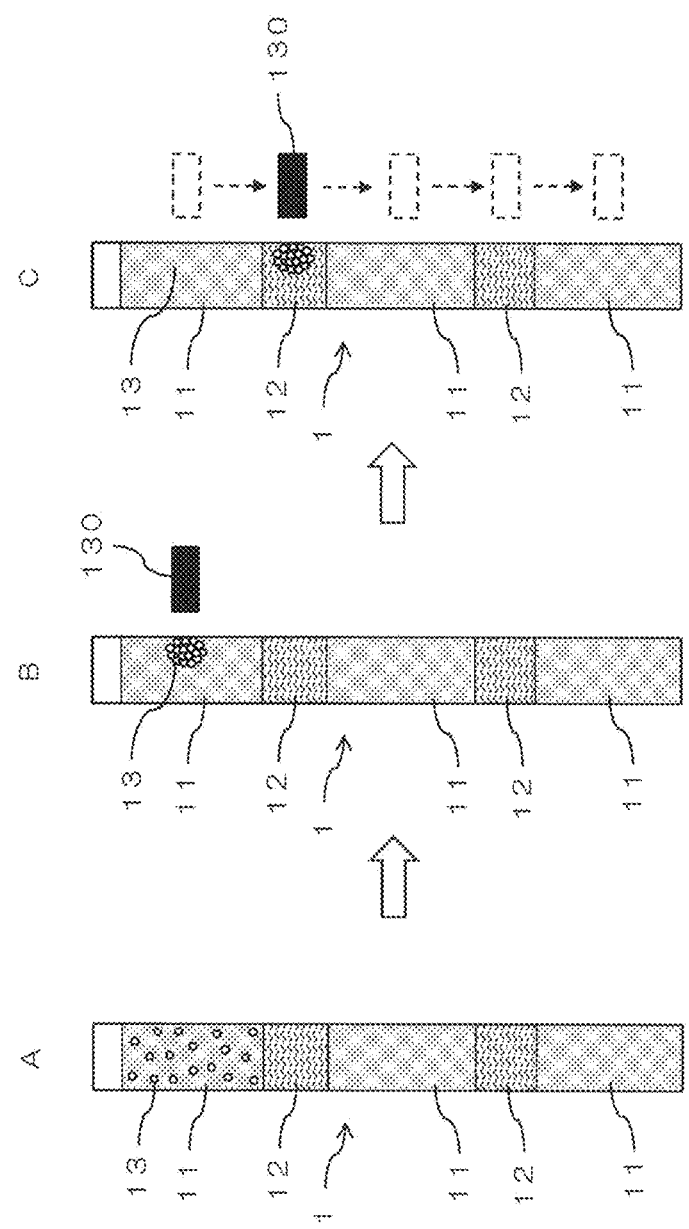
FIG. 5 is a schematic view for explaining an aspect when manipulating magnetic particles.

FIGS. 5A to 5C are schematic views for explaining an aspect when manipulating the magnetic particles 13. In FIGS. 5A to 5C, the shape of the device 1 is illustrated in a simplified manner for clarity of description. In FIG. 5A, the liquid layer 11 at the uppermost portion of the container 20 contains a large number of magnetic particles 13. As described above, the target substance contained in the liquid layer 11 is selectively immobilized to the magnetic particles 13 by dispersing the magnetic particles 13 in the liquid layer 11.

Thereafter, as illustrated in FIG. 5B, when the permanent magnet 130, which is a source of magnetic force, is brought close to the outer peripheral surface of the container 20, the magnetic particles 13 with the target substance immobilized are gathered to the permanent magnet 130 side (the protruding curved surface 222 side) in the container 20 by operation of the magnetic field. Then, as illustrated in FIG. 5C, when the permanent magnet 130 is moved along the outer peripheral surface of the container 20 in the longitudinal direction (up and down direction) of the container 20, the magnetic particles 13 also follow the change of the magnetic field to move along the longitudinal direction of the container 20, and sequentially moves through the liquid layers 11 and the gelatinous medium layers 12 which are alternately stacked.

Most of liquid physically attached as droplets around the magnetic particles 13 detaches from the surfaces of the magnetic particles 13 when the magnetic particles 13 enter the inside of the gelatinous medium layer 12. The entrance and movement of the magnetic particles 13 into the gelatinous medium layer 12 cause the gelatinous medium layer 12 to be perforated, but self-repairing action by resilience of the gel immediately clogs pores of the gelatinous medium layer 12. Therefore, inflow of liquid to the gelatinous medium layer 12 through the through holes by the magnetic particles 13 hardly occurs.

By dispersing the magnetic particles 13 in the liquid layer 11 and bringing the magnetic particles 13 into contact with liquid in the liquid layer 11, manipulations such as immobilization of the target substance to the magnetic particles 13, washing manipulation to remove contaminants adhering to the surfaces of the magnetic particles 13, reaction of the target substance immobilized to the magnetic particles 13, elution of the target substance immobilized to the magnetic particles 13 into liquid, and the like are performed.

4. Configuration of Latch Mechanism

Figure 6:
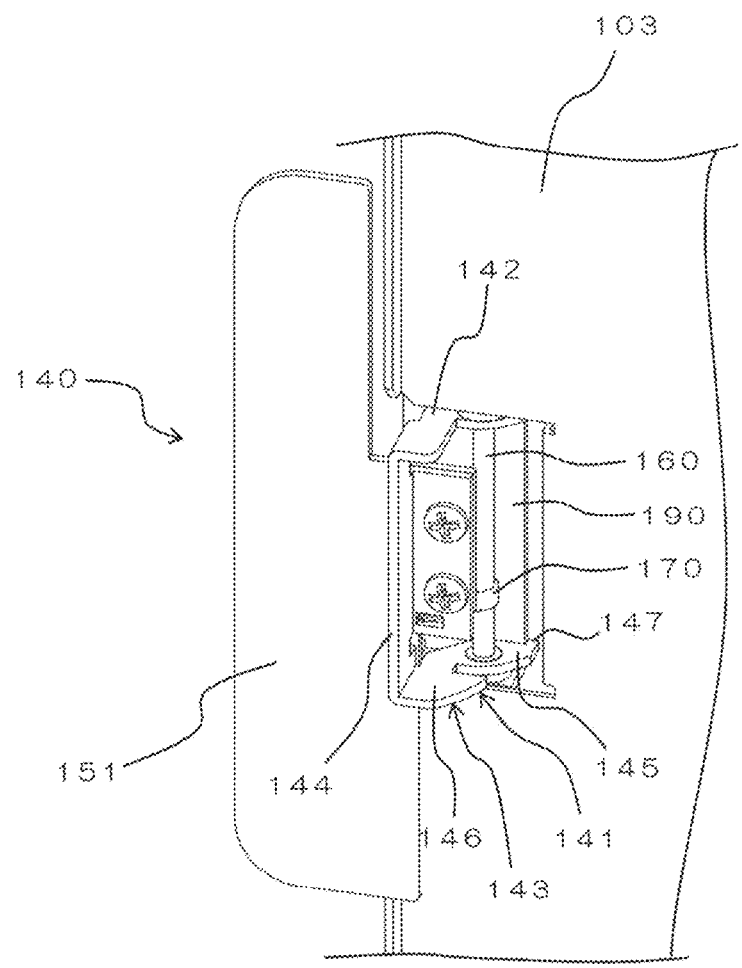
FIG. 6 is a perspective view illustrating a configuration of a pivoting part in a door of the apparatus for manipulating magnetic particles.
Figure 7:
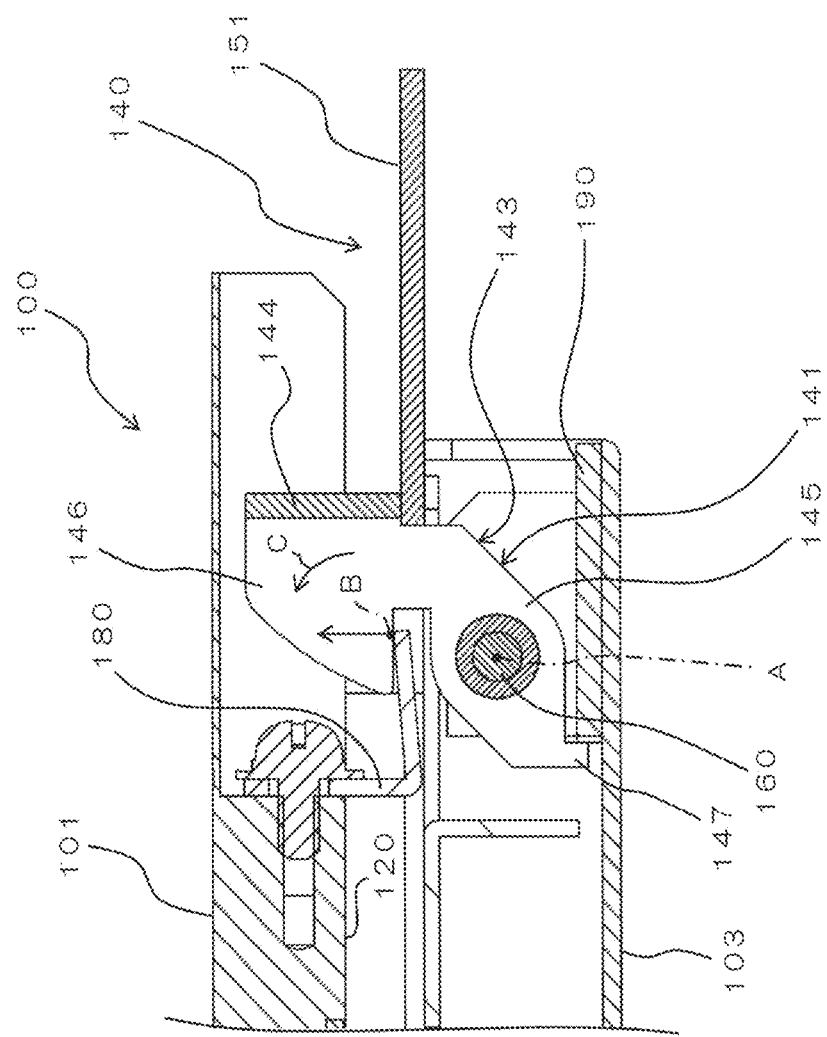
FIG. 7 is a cross-sectional view illustrating a configuration of a vicinity of a pivoting part in the apparatus for manipulating magnetic particles in a state that the door is closed.

FIG. 6 is a perspective view illustrating a configuration of a pivoting part 140 in the door 103 of the apparatus 100. FIG. 7 is a cross-sectional view illustrating a configuration around the pivoting part 140 in the apparatus 100 with the door 103 closed.

The apparatus 100 includes the main body 101 and the door 103 pivotably attached to the main body 101 as described above. The door 103 is provided with a pivoting part 140 and a shaft part 160.

The shaft part 160 is formed in a cylindrical shape extending in the up and down direction.

The pivoting part 140 is pivotably attached to the shaft part 160. The pivoting part 140 includes a latch 141 and a gripping part 151.

The latch 141 is pivotably attached to the shaft part 160, and the gripping part 151 is fixed to the latch 141. In addition, the latch 141 and the gripping part 151 may be formed as an integral part. The latch 141 includes an upper plate 142, a lower plate 143, and a vertical plate 144.

The upper plate 142, the lower plate 143, the vertical plate 144, and the gripping part 151 integrally pivot with respect to the shaft part 160. Specifically, as illustrated in FIG. 7, the pivoting part 140 (latch 141) is pivotable about a pivot axis A extending in the up and down direction. The pivot axis A passes through a center of the shaft part 160.

In this example, as a rotation direction centered on the pivot axis A, when viewed from above, a direction (C direction in FIG. 7) that is counterclockwise is a closing direction, and a direction that is clockwise is an opening direction. The opening direction is an example of a predetermined direction.

As illustrated in FIG. 6, in the apparatus 100, a torsion spring 170 is provided so as to cover the shaft part 160. The torsion spring 170 biases the pivoting part 140 (latch 141) in the closing direction. The torsion spring 170 is an example of a biasing member.

As illustrated in FIG. 7, the lower plate 143 of the latch 141 includes a central portion 145, a first contact portion 146, and a second contact portion 147.

The central portion 145 is formed with an opening (not illustrated) for inserting the shaft part 160.

The first contact portion 146 protrudes from one end of the central portion 145, and a portion thereof is formed in a hook shape.

The second contact portion 147 protrudes from the other end of the central portion 145.

Further, the main body 101 is provided with an engaging part 180. The engaging part 180 is formed in a bent plate shape having an L shape in plan view. Specifically, the engaging part 180 protrudes forward from the front surface 120 of the main body 101 and then protrudes outward (rightward) of the main body 101. More specifically, after the engaging part 180 protrudes forward from the front surface 120 of the main body 101, the engaging part 180 extends outward of the main body 101 while slightly inclining rearward as it goes outward (rightward) of the main body 101. In addition, the engaging part 180 may be formed in a flat plate shape (single plate) extending from the front surface 120 of the main body 101 outward of the main body 101. Moreover, the engaging part 180 may be formed in a bent plate shape having a Z shape in plan view. Specifically, the engaging part 180 may be configured such that a base end (upper end in FIG. 7) thereof extend inward (leftward) of the main body 101, and this portion is fixed to the main body 101 by screwing.

The pivoting part 140, the shaft part 160, the torsion spring 170, and the engaging part 180 constitute an example of a latch mechanism.

5. Engaging State of Each Member when the Door is Closed

As illustrated in FIG. 7, in a state that the door 103 is closed, the latch 141 of the pivoting part 140 is in contact (engagement) with the engaging part 180. Further, the door 103 is in close contact with the main body 101 so as to cover the container 20 (see FIG. 4) (the door 103 opposes the container 20). The position of the door 103 illustrated in FIG. 7 is a closed position. In a state that the door 103 is closed (the door 103 is located in the closed position), the first contact portion 146 of the latch 141 is in contact with a leading edge of the engaging part 180. Thus, the door 103 is fixed to the main body 101 in a closed state. Then, the door 103 is kept closed. Note that as illustrated in FIG. 3, the position of the door 103 when the door 103 is rotated from the closed position and separated from the container 20 (see FIG. 4) is an open position.

Further, as described above, the biasing force of the torsion spring 170 is applied to the latch 141. Thus, a force is applied to the latch 141 in the closing direction (C direction). Further, the second contact portion 147 of the latch 141 is engaged with an engagement plate 190 provided on the door 103, and further rotation (rotation in the closing direction) of the latch 141 is restricted. In this state, the gripping part 151 is disposed along a radial direction (left and right direction in FIG. 7) orthogonal to an opposing direction (up and down direction in FIG. 7) of the door 103 and the main body 101. The gripping part 151 may be slightly inclined with respect to the direction orthogonal to the opposing direction of the door 103 and the main body 101.

From this state, when the gripping part 151 is rotated in the opening direction (clockwise direction in FIG. 7) by the user, the engaging state between the latch 141 (the first contact portion 146) and the engaging part 180 is released, and it becomes possible to open the door 103.

In a state that the door 103 is closed, a contact point B (contact position) between the first contact portion 146 of the latch 141 and the engaging part 180 is located more outside (on a right side in FIG. 7) of the main body 101 than the pivot axis A. In other words, the pivot axis A is located closer to a pivot center side (left side in FIG. 7) of the door 103 than the contact point B (contact position) in a radial direction (left and right direction in FIG. 7) orthogonal to both the opposing direction of the door 103 and the main body 101 (up and down direction in FIG. 7) and a vertical direction in which the pivot axis A extends (direction orthogonal to the view of FIG. 7). Accordingly, in a case where an external force is applied to the door 103 in the direction to open the door 103, the latch 141 (first contact portion 146) receives a force from the engaging part 180 due to engagement of the latch 141 (first contact portion 146) and the engaging part 180. The case where an external force is applied to the door 103 in the direction to open the door 103 means that an external force is applied to the door 103 in the direction to open the door by other than an operation such as pulling the door 103 toward the front (other than an operation by the user for pivoting the pivoting part 140). Then, a rotational force directed in the closing direction (C direction) with respect to the latch 141 (first contact portion 146) is generated by this force. As a result, a force is applied to the latch 141 in the direction opposite to the direction in which the engaging state with the engaging part 180 is released. Therefore, the closed state of the door 103 is maintained without releasing the engaging state between the latch 141 and the engaging part 180.

6. Operation and Effect (1) According to the present embodiment, an apparatus 100 for manipulating magnetic particles includes a latch mechanism. As illustrated in FIG. 7, the latch mechanism has a pivoting part 140 provided on a door 103 and an engaging part 180 provided on a main body 101. In the apparatus 100 for manipulating magnetic particles, a first contact portion 146 of the latch 141 engages (contacts) the engaging part 180 at a contact point B in a state that the door 103 is closed. The contact point B (contact position) is located more outside (on the right side in FIG. 7) of the main body 101 than a pivot axis A.

Accordingly, in a case where an external force is applied to the door 103 in a direction to open the door 103 in a state that the door 103 is closed, a force is applied from the engaging part 180 to the first contact portion 146, thereby generating a rotational force in the C direction, which is a direction opposite to a direction in which the engaging state with the engaging part 180 is released, to the pivoting part 140.

As a result, in the state that the door 103 is closed, it is possible to suppress the door 103 from being opened without a manipulation by the user.

Therefore, in the apparatus 100 for manipulating magnetic particles, the door 103 in a closed state can be maintained in a stable state. Further, in the state that the door 103 is closed, the distance between the container 20 and the door 103 is accurately maintained.

(2) Further, according to the present embodiment, as illustrated in FIG. 7, the pivot axis A is located closer to a pivot center side of the door 103 than the contact point B (contact position) in a radial direction (left and right direction in FIG. 7) orthogonal to both an opposing direction of the door 103 and the main body 101 (up and down direction in FIG. 7) and a vertical direction in which the pivot axis A extends (direction orthogonal to the view of FIG. 7).

Accordingly, in a state that the door 103 is located in the closed position, a force can be reliably applied from the engaging part 180 to the pivoting part 140 in the direction opposite to the direction in which the engaging state with the engaging part 180 is released.

(3) Further, according to the present embodiment, as illustrated in FIG. 7, the pivoting part 140 is provided on the door 103, and the engaging part 180 is provided on the main body 101.

Therefore, the door 103 in a closed state can be maintained in a stable state with a simple configuration.

(4) Further, according to the present embodiment, as illustrated in FIG. 6, in the apparatus 100 for manipulating magnetic particles, the latch mechanism has a torsion spring 170. The torsion spring 170 biases the pivoting part 140 in a closing direction (C direction) opposite to an opening direction.

That is, the torsion spring 170 applies a biasing force to the pivoting part 140 in the direction opposite to the direction in which the engaging state with the engaging part 180 is released.

Therefore, in the state that the door 103 is closed, it is possible to further suppress the door 103 from being opened without a manipulation by the user. The door 103 in a closed state can be maintained in a stable state.

7. Modification Example

In the above embodiment, as the latch mechanism, it has been described that the pivoting part 140 is provided on the door 103 and the engaging part 180 is provided on the main body 101. However, the door 103 may be provided with a similar configuration to the engaging part 180, the main body 101 may be provided with a similar configuration to the pivoting part 140, and these may be configured to engage in a state that the door 103 is closed. With such a configuration, the door 103 in a closed state can be maintained in a stable state with a simple configuration.

What is claimed is:

1. An apparatus for manipulating magnetic particles, comprising:
 a main body that holds a tubular container in which a liquid layer is formed and which is filled with magnetic particles;
 a movable magnet provided in the main body that attracts the magnetic particles in the container;
 a door that is pivotally attached to the main body and pivotably moves between a closed position opposing the container and an open position separated from the container; and
 a latch mechanism that keeps the door in a state of being located in the closed position, wherein
 the latch mechanism has:
 a pivoting part pivotable about a pivot axis; and
 an engaging part that engages with the pivoting part by contacting the pivoting part at a contact position in a state that the door is located in the closed position, in which an engaging state is released when the pivoting part is pivoted in a predetermined direction about the pivot axis, wherein
 the engaging part is configured, in a case where an external force to the apparatus is applied in a direction toward the open position to the door located in the closed position, a second force operates on the pivoting part at the contact position from the engaging part in a direction to pivot the pivoting part toward a side opposite to the predetermined direction, and the closed position of the door is maintained by the second force without releasing the engaging state of the engaging part,
 wherein in a state that the door is located in the closed position, the pivot axis is located closer to a pivot center side of the door than the contact position in a radial direction orthogonal to both an opposing direction of the door and the main body and a vertical direction in which the pivot axis extends,
 wherein the magnetic particles are attracted to the movable magnet.

2. The apparatus for manipulating magnetic particles according to claim 1, wherein
 the pivoting part is provided on the door, and
 the engaging part is provided on the main body.

3. The apparatus for manipulating magnetic particles according to claim 1, wherein
 the pivoting part is provided on the main body, and
 the engaging part is provided on the door.

4. The apparatus for manipulating magnetic particles according to claim 1, wherein the latch mechanism has a biasing member that biases the pivoting part in a direction to pivot toward a side opposite to the predetermined direction.

* * * * *